UNITED STATES PATENT OFFICE.

HOWARD F. CHAPPELL, OF NEW YORK, N. Y., ASSIGNOR TO MINERAL PRODUCTS CORPORATION, OF NEW YORK, N. Y., A CORPORATION OF MAINE.

TREATMENT OF ALUNITE AND THE LIKE.

1,195,655.  Specification of Letters Patent.  Patented Aug. 22, 1916.

No Drawing.  Application filed September 23, 1913.  Serial No. 791,288.

*To all whom it may concern:*

Be it known that I, HOWARD F. CHAPPELL, a citizen of the United States, residing in the borough of Manhattan, city, county, and State of New York, have invented certain new and useful Improvements in the Treatment of Alunite and the like; and I do hereby declare the following to be a full, clear, and exact description of the invention, such as will enable others skilled in the art to which it appertains to make and use the same.

My invention relates to the treatment of alunite, alum-stone, alum-rock, and other like natural and artificial substances, for the purpose of recovering useful products therefrom, that is to say, such products as aluminum oxid, sulfate of potash and elemental sulfur.

The invention is likewise applicable to the recovery of elemental sulfur from alum, and also to the recovery of aluminum oxid and sulfate of potash from natural and artificial substances, whether sulfur is obtained therefrom in elemental form or not during the operation.

The invention is based upon the discovery that if alum, alunite, alum-stone, alum-rock, and the like, are calcined, within a suitable range of temperature, in the presence of a reducing atmosphere, sulfur will be released therefrom in elemental form, and may be recovered by sublimation and condensation; and, furthermore, even though the temperature conditions prevailing in the calcining operation may be such that more or less of the sulfur is driven off as sulfurous anhydrid, or sulfuric anhydrid, or both, the conversion of the aluminum compounds into aluminum oxid insoluble in water and the potash compounds into soluble sulfate of potash is possible and feasible in the presence of a reducing atmosphere in which substantially no free oxygen is present.

In the practice of the invention, for the recovery of insoluble aluminum oxid and the recovery of soluble sulfate of potash, without special reference to the recovery of sulfur in elemental form, I calcine the alunite, alum-stone, alum-rock, or the like, in a reducing atmosphere wherein practically no free oxygen is present. Such a reducing atmosphere may, for instance, be obtained by admitting a reducing or deoxidizing gas (as, for instance, producer gas) into a retort or muffle containing the alunite, alum-stone, or alum-rock to be treated. The retort or muffle may then be heated externally to a temperature ranging from 650° C. to 1000° C. and beyond, with the result that the aluminum compounds will be converted into insoluble aluminum oxid, the potash compounds into sulfate of potash, and that the excess of sulfur will be driven off either as elemental sulfur, or as sulfurous anhydrid or sulfuric anhydrid, according to the range of temperature maintained. Thus, if the range of temperature is restricted within the limits of 650° C. to 1000° C., the excess of sulfur will be recovered mainly as sublimed elemental sulfur. If producer gas is used as the reducing agent, and if the temperature is allowed to rise materially above 1000° C. the excess sulfur will be driven off as sulfurous anhydrid and sulfuric anhydrid, with the evolution of but little, if any, elemental sulfur. So also, even though atmospheric air is admitted into the retort or muffle, for the purpose of maintaining a partial combustion therein of the reducing gas, thereby assisting the development of heat therein, the driving off of the excess sulfur from the alunite, alum-rock or alum-stone proceeds even at the lower limit of 650° C., provided that the conditions within the retort or muffle are nevertheless maintained strongly reducing. It will be noted, therefore, that quite aside from the circumstance as to whether the excess of sulfur is recovered in an elemental form or not, a strongly reducing atmosphere enables the desulfurizing of the mass to proceed at temperatures which have a lower range than are feasible where the conditions are strongly oxidizing. On the other hand, if as indicated, the temperature is carried to a point materially greater than 1000° C. there will be no substantial recovery of the excess sulfur in elemental form, even though the calcination be carried on with the admission of producer gas and with the exclusion of atmospheric air. It is, therefore, of advantage, and, indeed, essential to the recovery of the excess of sulfur in the elemental form that the higher temperatures substantially above 1000° C. be avoided.

As hereinbefore noted, the recovery of sulfur in the elemental form, in accordance with my invention, is applicable not only to the native minerals alunite, alum-stone and alum-rock, but also to alum *per se.* In all cases, the alum, alunite, alum-stone or alum-rock, should be first deprived of their moisture and water of crystallization by calcination, so that there may be present no watery vapors to diminish the efficiency of the reducing atmosphere. The temperature of the dehydrated material, after it is charged into the retort or muffle, is raised to the point where fumes of sulfurous anhydrid just become perceptible. This temperature is usually in the neighborhood of 650° C. Thereupon, a slow stream of gas, (preferably producer gas), possessing reducing or deoxidizing properties is introduced. Care must be taken not to permit the temperature of the gases in the retort or the temperature of the substance treated to rise too high, if elemental sulfur is to be produced, for the reason that too high a temperature, as hereinbefore explained, will bring about a cessation of the reducing action of the gases.

While the possible range of temperature is from 650° C. to 1000° C., I have obtained the best results when the temperature was kept at approximately 800° C. The reducing gas should be admitted very slowly to the retort or muffle and should be kept under careful control, as otherwise the heat evolved by the reaction will cause the temperature to rise to a point that will arrest the reducing or deoxidizing action of the gas and will result in the evolution of sulfurous anhydrid, sulfuric anhydrid, or both.

While the reducing gas employed may be illuminating gas, such as coal gas or water gas, I give preference to producer gas, because its production is simple and economical and readily controlled, and because, by reason of its composition, it gives more uniform results. It will, of course, be understood that the sulfate of potash (potassium sulfate) being soluble in water, may be dissolved out of the calcined ore with water, by any ordinary method of leaching, thereby leaving the insoluble aluminum oxid. The soluble sulfates are recovered from the leachings.

Having thus described my invention, what I claim is:

1. The process of treating alum, alum-stone, alum-rock and alunite, which comprises submitting the same, in a reducing atmosphere, to a temperature sufficient to convert substantially all of the potassium compounds contained therein into potassium sulfate, and substantially all of the aluminum compounds into insoluble aluminum oxid and thereupon lixiviating out the potassium sulfate; substantially as described.

2. The process of treating alum, alum-stone, alum-rock and alunite, which comprises submitting the same, in the presence of a reducing atmosphere, to a temperature sufficiently high to drive off, in elemental form, the sulfur of the material treated in excess of that required for the formation of sulfate of potash, and recovering the sulfur thus driven off; substantially as described.

3. The process of treating alum, alum-stone, alum-rock and alunite, which comprises submitting the same, in the presence of a reducing atmosphere, to a temperature ranging between 650° C. and 1000° C., in the presence of a reducing atmosphere, and subliming and recovering as elemental sulfur the excess sulfur over that required for the production of potassium sulfate; substantially as described.

In testimony whereof I affix my signature, in presence of two witnesses.

HOWARD F. CHAPPELL.

Witnesses:
M. A. BILL,
JOHN C. PENNIE.